(12) United States Patent
Cahill et al.

(10) Patent No.: US 7,716,365 B2
(45) Date of Patent: May 11, 2010

(54) AUTOMATICALLY TARGETING AND FILTERING SHARED NETWORK RESOURCES

(75) Inventors: Jason M. Cahill, Woodinville, WA (US); Adrian Fanaru, Sammamish, WA (US); Titus C. Miron, Seattle, WA (US); Umesh Unnikrishman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/807,591

(22) Filed: May 29, 2007

(65) Prior Publication Data

US 2008/0301299 A1 Dec. 4, 2008

(51) Int. Cl.
G06F 15/173 (2006.01)
G06F 15/16 (2006.01)

(52) U.S. Cl. .................. 709/238; 709/225; 709/226; 709/229

(58) Field of Classification Search .................. None
See application file for complete search history.

(56) References Cited

U.S. PATENT DOCUMENTS

| | | |
|---|---|---|
| 6,195,678 B1 | 2/2001 | Komuro |
| 6,216,162 B1 | 4/2001 | Dutcher et al. |
| 6,308,173 B1* | 10/2001 | Glasser et al. ............... 707/9 |
| 6,446,129 B1* | 9/2002 | DeForest et al. ............ 709/230 |
| 2004/0128347 A1* | 7/2004 | Mason et al. ............... 709/203 |
| 2004/0210724 A1* | 10/2004 | Koning et al. ............... 709/215 |
| 2005/0021725 A1 | 1/2005 | Lobbert |
| 2005/0071203 A1* | 3/2005 | Maus ........................ 705/4 |
| 2005/0234982 A1 | 10/2005 | Yamamoto et al. |
| 2006/0069664 A1* | 3/2006 | Ling et al. .................. 709/219 |
| 2006/0277595 A1* | 12/2006 | Kinser et al. ................ 726/3 |
| 2007/0006325 A1 | 1/2007 | Gargaro |
| 2007/0033167 A1 | 2/2007 | Basu et al. |

(Continued)

FOREIGN PATENT DOCUMENTS

WO WO2006/020758 2/2006

(Continued)

OTHER PUBLICATIONS

Lee, C., Helal, S., "Context Attributes: An Approach to Enable Context-awareness for Service Discovery", Computer and Information Science and Engineering Department, University of Florida, pp. 1-9, Gainesville, FL, US, 2003.

(Continued)

Primary Examiner—Joseph E Avellino
Assistant Examiner—Dung Huynh
(74) Attorney, Agent, or Firm—Merchant Gould P. C.

(57) ABSTRACT

Embodiments are provided to automatically target shared resources in a computer network which are pertinent to a query for information from a client and/or a server through the use of a shared resources portal. In one embodiment, a query is received in the shared resources portal from a requestor. The portal may then identify a target resource server to which to route the query by filtering the information provided by a number of shared resource servers in the network against information regarding an organizational role performed by the requester. The identified target resource server may be one which provides information pertinent to the organizational role performed by the requester. The query is then processed in the identified target resource server.

14 Claims, 4 Drawing Sheets

U.S. PATENT DOCUMENTS

2007/0038610 A1 2/2007 Omoigui
2007/0041035 A1* 2/2007 Sembower et al. ......... 358/1.15

FOREIGN PATENT DOCUMENTS

WO    WO2006/089411    8/2006

OTHER PUBLICATIONS

Obraczka, K., Danzig, P.B., Li, S-H, "Internet Resource Discovery Services", Computer Sciences Department, University of Southern California, IEEE Computer Magazine, vol. 26, No. 9, pp. 8-22, Sep. 1993, US.

Sinha, S., Lindvall, M., Rus, I., "Software Systems Support for Knowledge Management", 2004 Project Performance Corporation, pp. 1-20, McLean, VA, US.

* cited by examiner

FIGURE 4

AUTOMATICALLY TARGETING AND FILTERING SHARED NETWORK RESOURCES

BACKGROUND

Many business organizations have a network infrastructure to allow access to shared resources by many clients having multiple roles within an organization. For example, shared resources within a business organization may be utilized by a number of different departments such as legal, engineering, sales, human resources and the like. These resources typically include data and services which may be utilized for conducting research or creating documents. As the resources provided by many business organizations may be quite substantial, an organization may further provide clients access to a centralized "intelligent" directory for locating relevant resources or other resources of interest. The intelligent directory may be a high speed database which is connected to the various resources within an organization. The intelligent directory may then be manually accessed via a web-based query interface by a client, to search for desired information. Due to limitations in conventional directory technologies, clients utilizing a present-day directory may be required to peruse through a number of listings, including documents which are irrelevant to the client's role within the organization or which the client is not permitted to access, making the searching for and accessing of shared resources very time consuming and tedious. For example, with conventional directory technologies, clients do not know the various permissions which may be associated with documents they are searching for, nor are they given a starting point for accessing relevant documents which may be pertinent to the client's role within an organization. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to automatically target shared resources in a computer network which are pertinent to a query for information from a client and/or a server through the use of a shared resources portal. In one embodiment, a query is received in the shared resources portal from a requestor. The portal may then identify a target resource server to which to route the query by filtering the information provided by a number of shared resource servers in the network against information regarding an organizational role performed by the requestor. The identified target resource server may be one which provides information pertinent to the organizational role performed by the requestor. The query is then processed in the identified target resource server.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided to automatically target shared resources in a computer network which are pertinent to a query for information from a client and/or a server through the use of a shared resources portal. In one embodiment, a query is received in the shared resources portal from a requester. The portal may then identify a target resource server to which to route the query by filtering the information provided by a number of shared resource servers in the network against information regarding an organizational role performed by the requestor. The identified target resource server may be one which provides information pertinent to the organizational role performed by the requestor within a business organization. The query is then processed in the identified target resource server.

Figure 1:
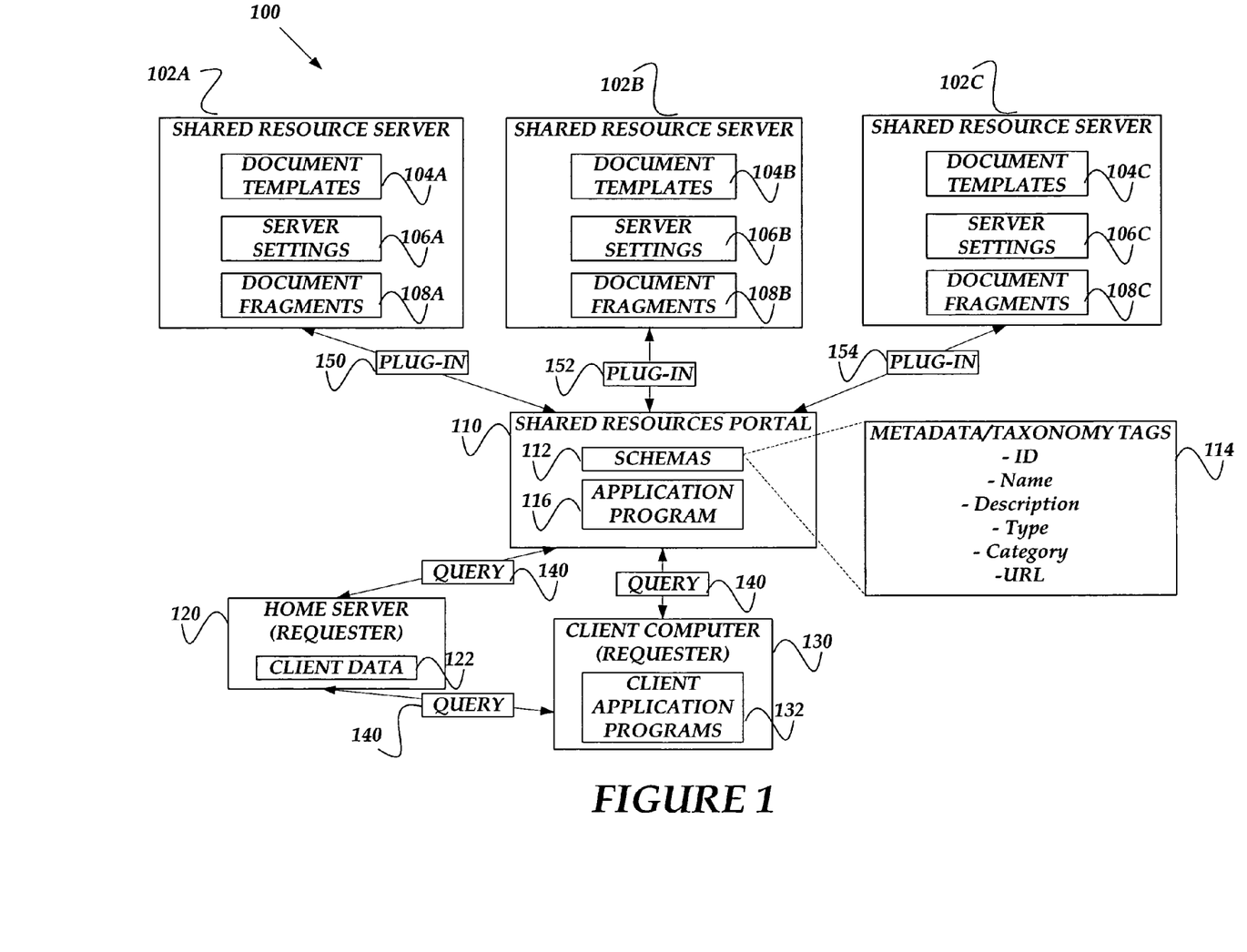
FIG. 1 is a network architecture diagram of a system configured to automatically target shared resources in a computer network, in accordance with various embodiments.

Referring now to the drawings, in which like numerals represent like elements, various illustrative embodiments will now be described. FIG. 1 is a network architecture diagram of a computer network 100 that is configured to automatically target shared resources. In one embodiment, various components in the computer network 100 may be configured using SHAREPOINT services technology developed by MICROSOFT CORPORATION of Redmond, Wash. As is known to those skilled in the art, SHAREPOINT services technology enables users to create, maintain, and present a collaborative environment to share information. Using the technology, a user or organization can create a web site to provide and share information (e.g., documents on a web server or web folder, etc.) for other users associated with the web site. For example, users can use a number of document templates or fragments to prepare documents which are generated by members of a particular workgroup in a business organization. It should be understood that the embodiments described herein should not be construed as being limited to SHAREPOINT services technology and that other collaborative services technology from other developers and/or manufacturers may also be utilized. The computer network 100 and its components include functionality to communicate with other computing devices, communication devices, and/or other systems and are not intended to be limited to the embodiments and examples described herein.

As shown in FIG. 1, the computer network 100 includes, without limitation, shared resource servers 102A, 102B, and 102C (hereinafter collectively referred to as the shared resource servers 102), a shared resources portal 110, a home server 120, and a client computer 130. In one embodiment, the shared resources servers 102A, 102B, and 102C as well as the shared resources portal 110 and the home server 120 may be configured to utilize SHAREPOINT services technology to create a collaborative environment for sharing information with the client computer 130. In particular, in accordance with one embodiment, the shared resource servers 102 and the home server 120 may be configured to run the WINDOWS SHAREPOINT SERVICES application program and the shared resources portal 110 may be configured to run the OFFICE SHAREPOINT SERVER application program, both of which are from MICROSOFT CORPORATION of Redmond, Wash. It should be appreciated, however, that web server application programs from other manufacturers may also be utilized to embody the various aspects of the technical features discussed herein.

The shared resource servers 102 are in communication with the shared resources portal 110. In accordance with various embodiments, the shared resource servers 102 may be utilized to provide various resources in the network 100 such as data which may be used in creating, editing, and maintaining documents on the client computer 130. In accordance with various embodiments, each of the resources provided by the shared resource servers 102 may utilized by different organizational roles within an organization. For example, the shared resource server 102A may be utilized to store documents which are relevant to a legal department, the shared resource sever 102B may be utilized to store documents which are relevant to an engineering department, and the shared resource server 102C may be utilized to store documents which are relevant to a sales department.

The shared resource servers 102 may include, without limitation, document templates 104A, 104B, and 104C (hereinafter collectively referred to as the document templates 104), server settings 106A, 106B, and 106C (hereinafter collectively referred to as the server settings 106), and document fragments 108A, 108B, and 108C (hereinafter collectively referred to as the document fragments 108). In accordance with one embodiment, the document templates 104 may be utilized by clients in the network 100 to provide a starting point in the creation of documents for use in an organization. For example, a legal department within an organization may utilize document templates to assist in creating contracts and invoices. The server settings 106 may be utilized by the shared resource servers 102 in the network 100 to store various settings such as email settings, corporate retention policies, and permissions as to which workgroups within an organization have access to certain documents. For example, a server which stores financial information within a banking organization may have settings preventing stock traders from accessing sensitive corporate financial information used by investment bankers. As will be described in greater detail herein, the server settings 106 may be automatically propagated from the shared resource servers 102 to the shared resources portal 110 for targeting to one or more clients in a network. The document fragments 108 may be repositories of reusable pieces of text for use in various documents (e.g., legal "boilerplate" language used in contracts) by clients in the network 100.

The shared resources portal 110 is in communication with the shared resource servers 102, the home server 120 and/or the client computer 130. The shared resources portal 110 may include, without limitation, schemas 112 and an application program 116. Each of the schemas 112 may include a list of metadata and taxonomy tags 114 which may be utilized by the shared resources portal 110 to identify (i.e., discover) the resources provided by the shared resource servers 102. The metadata and taxonomy tags 114 may include, without limitation, a unique identifier (ID) tag, a Name tag, a Description tag, a Type, a Category tag (and associated Subcategory tags), and a Uniform Resource Locator (URL) tag. It will be appreciated that the schemas 112 may include other metadata and taxonomy tags to further define the resources or content provided by the shared resource servers 102. The application program 116 may be a portal server application program utilized to implement various functions performed by the shared resources portal 110.

In accordance with various embodiments, the shared resources portal 110 may be configured to receive the query 140 from the home server 120 or the client computer 130 (i.e., the requestor), identify a target resource server from among the shared resource servers 102 to which to route the query 140 by filtering the information provided by the shared resource servers 102 against information regarding an organizational context or role performed by the requestor. The identified target resource server may be one which provides information pertinent to the organizational role performed by the requestor. The query is then processed in the identified target resource server. For example, a document query from a client serving an engineering role in a business organization may be targeted to a resource server which stores and distributes engineering documents for processing. It will be appreciated by those skilled in the art, that the functionality of the shared resources portal 110 may be implemented through the use of plug-in modules 150, 152, and 154. In particular, the plug-in modules 150, 152, and 154 may be utilized by the shared resources portal 110 to adapt to different protocols used in communications by the shared resource servers 102. It will further be appreciated by those skilled in the art that communication between the shared resources portal 110 and the shared resource servers 102, the home server 120, and the client computer 130 may implemented through a set of Object Management Application Programming Interfaces ("OMAPIs"). In particular, the shared resources portal 110 may be configured to automatically call these interfaces to expose lists of resources provided by the shared resource servers 102 and to share these lists with either the home server 120 or the client 130.

The home server 120 is in communication with the shared resources portal 110 and the client computer 130. In accordance with one embodiment, the home server 120 may be utilized as a requestor to forward queries from the client computer 130 to the shared resources portal 110 for processing. It will be appreciated by those skilled in the art that the home server 120 may be associated with the client computer 130 to facilitate the forwarding of queries utilizing a number of methods including, but not limited to, via a user web interface on the client computer 130 (e.g., the user may associate a "home" webpage for communicating with the home server 120) or via registry key settings or Group Policy. The home server 120 may further include client data 122 regarding a context or role associated with the client computer 130 which may be sent to the shared resources portal 110 along with the query 140. In one embodiment the client data 122 may be compared to the metadata and taxonomy tags 114 by the shared resources portal 110 to determine a target resource server for a query. For example, the home server 120 may receive a query from the client computer 130 and determine from the client data 122 that the client computer 130 is utilized in the legal department in a business organization. The client data 122 may further include additional information such as the identity of the user of the client computer 130, the types of legal documents the user typically works on, the identify of other attorneys within the organization who the user typically works with, etc. It should be understood that the computer network 100 may include multiple home servers and multiple client computers. It will be appreciated that a single home server may be paired with multiple client computers performing a similar role within an organization. For example, a home server may be associated with multiple client computers within the human resources department of a business organization.

The client computer 130 is in communication with the home server 120 and the shared resources portal 110 and may include client application programs 132. As discussed above, the client computer 130 may be configured to forward queries generated from the client application programs 132 to the shared resources portal through the home server 120. In an alternative embodiment, the client computer 130 may also be configured to forward queries directly to the shared resources portal 120. The client application programs 132 may be utilized to create, edit, and maintain documents within an organization. The client application programs may comprise a suite of productivity application programs (e.g., word processing and spreadsheet application programs) such as the OFFICE suite of application programs from MICROSOFT CORPORATION of Redmond, Wash. It should be appreciated, however, that productivity application programs from other manufacturers may also be utilized to embody the various aspects of the technical features discussed herein.

Exemplary Operating Environment

Figure 2:
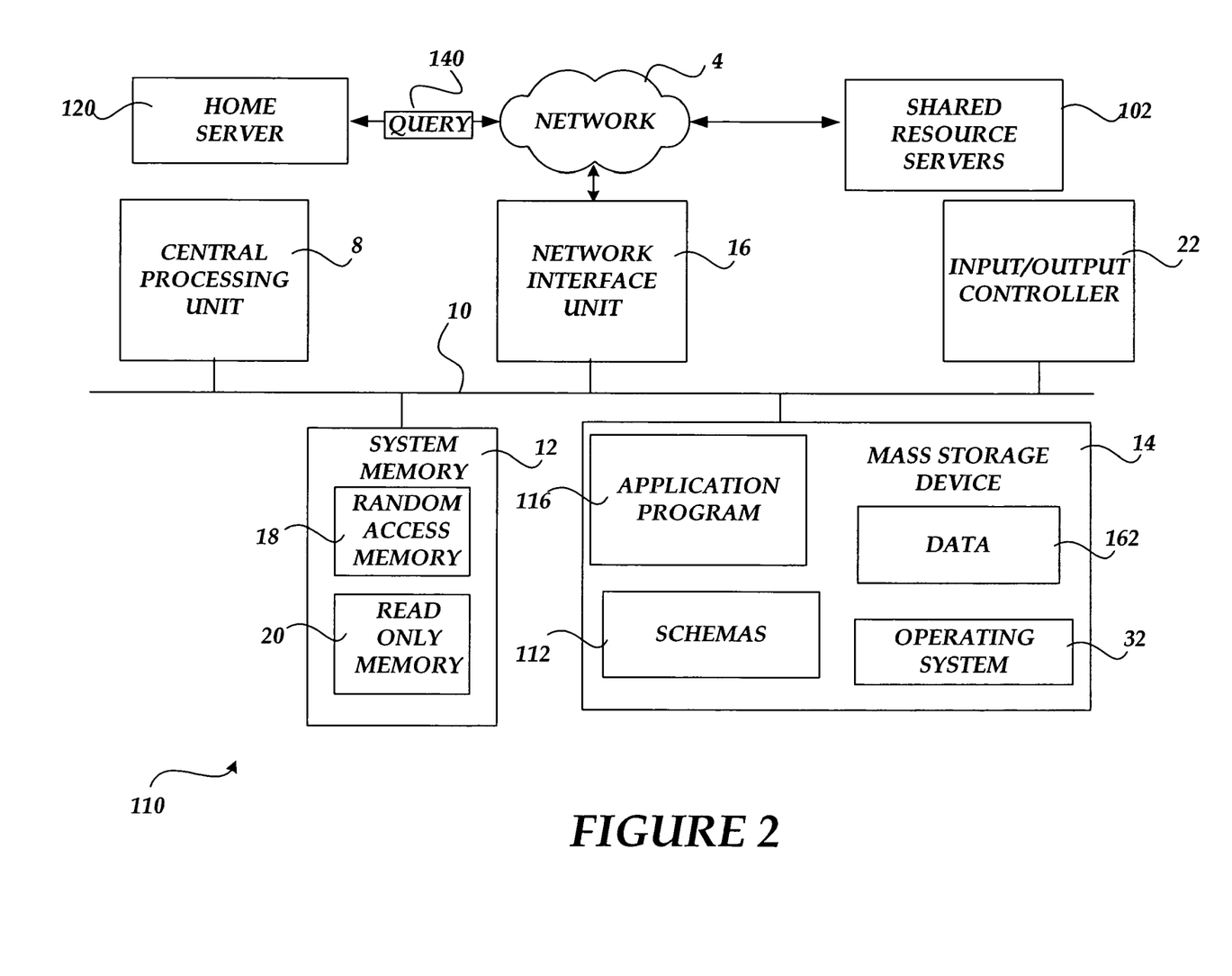
FIG. 2 is a block diagram illustrating a computing environment for implementing various embodiments described herein.

Referring now to FIG. 2, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 2, an illustrative operating environment for embodiments of the invention will be described. As shown in FIG. 2, the shared resources portal 110 comprises a server computer which may include a general purpose desktop, laptop, handheld, tablet, or other type of computer capable of executing one or more application programs. The shared resources portal 110 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The shared resources portal 110 further includes a mass storage device 14 for storing an operating system 32, the schemas 112, the application program 116, and data 162. The mass storage device 14 is connected to the CPU 8 through a mass storage controller (not shown) connected to the bus 10. The mass storage device 14 and its associated computer-readable media provide non-volatile storage for the shared resources portal 110. Although the description of computer-readable media contained herein refers to a mass storage device, such as a hard disk or CD-ROM drive, it should be appreciated by those skilled in the art that computer-readable media can be any available media that can be accessed or utilized by the shared resources portal 110.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the shared resources portal 110.

According to various embodiments of the invention, the shared resources portal 110 may operate in a networked environment using logical connections to remote computers through a network 4, such as a local network or a wide area network (e.g., the Internet), for example. The shared resources portal 110 may connect to the network 4 through a network interface unit 16 connected to the bus 10. As shown in FIG. 2, the network 4 connects the shared resources portal 110 to the home server 120 and the shared resource servers 102.

It should be appreciated that the network interface unit 16 may also be utilized to connect to other types of networks and remote computing systems. The shared resources portal 110 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the shared resources portal 110, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store the schemas 112 and the application program 116.

Figure 3:
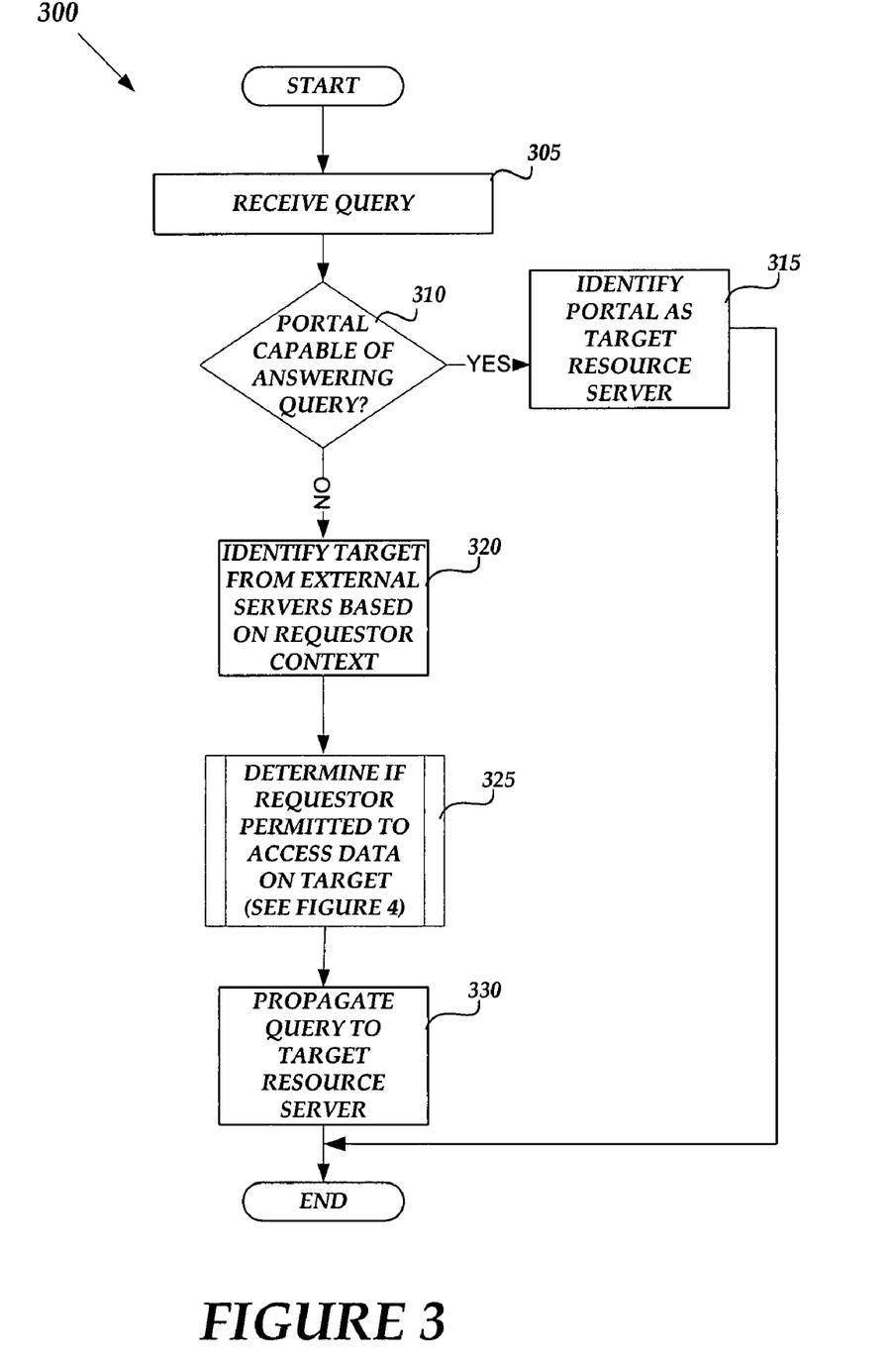
FIG. 3 is a flow diagram illustrating a routine for automatically targeting shared resources in a computer network, in accordance with various embodiments.

FIG. 3 is a flow diagram illustrating a routine 300 for targeting shared resources in a computer network, under an embodiment. The components of FIGS. 1 and 2 are referred to in the description of FIG. 3, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, where the shared resources portal 110 receives a shared resources query from a requester which may be either the home server 120 or the client computer 130. The query may include a request for a request for a document template, a document fragment, or other data.

From operation 305, the routine 300 continues to operation 310, where the shared resources portal 110 determines whether it is capable of answering the query for a shared resource. In particular, the shared resources portal 110 may request the client data 122 from the home server 120 and determine a role associated with the requester based on the client data 122. The shared resources portal 110 may then determine if the data 162 stored in the shared resources portal 110 is capable of answering the query. For example, if the query includes a request for a document template used by the legal department in an organization, the shared resources portal 110 may determine if the data 162 includes a list of legal document templates.

If, at operation 310, it is determined that the shared resources portal 110 is capable of answering the query, then the routine 310 continues to operation 315 where the shared resources portal 110 identifies itself as the target resource server. The shared resources portal 110 may then process the query utilizing the data 162 (e.g., by returning a directory list of legal document templates to the home server 120 or the client computer 130). From operation 315, the routine 300 then ends.

If, at operation 310, it is determined that the shared resources portal 110 is not capable of answering the query, then the routine 300 branches to operation 320 where the shared resources portal 110 identifies a target resource server from among the shared resource servers 102 based on the context or role associated with the requestor. In particular, the shared resources portal 110 may compare the client data 122, which may include the organizational role associated with the requester, to the metadata and taxonomy tags 114 in the schemas 112 to determine a shared resource server for processing the query. For example, if the shared resources portal 110 determines that the requestor of a query for document fragments is associated with an engineering department within an organization, the shared resources portal 110 may then search the metadata and taxonomy tags to identify a shared resource server which includes a fragment repository for storing engineering document fragments.

From operation 320, the routine 300 continues to operation 325, where the shared resources portal 110 determines whether the requestor is permitted to access data for answering the query on the identified target server, as will be described in greater-detail below with respect to FIG. 4.

Figure 4:
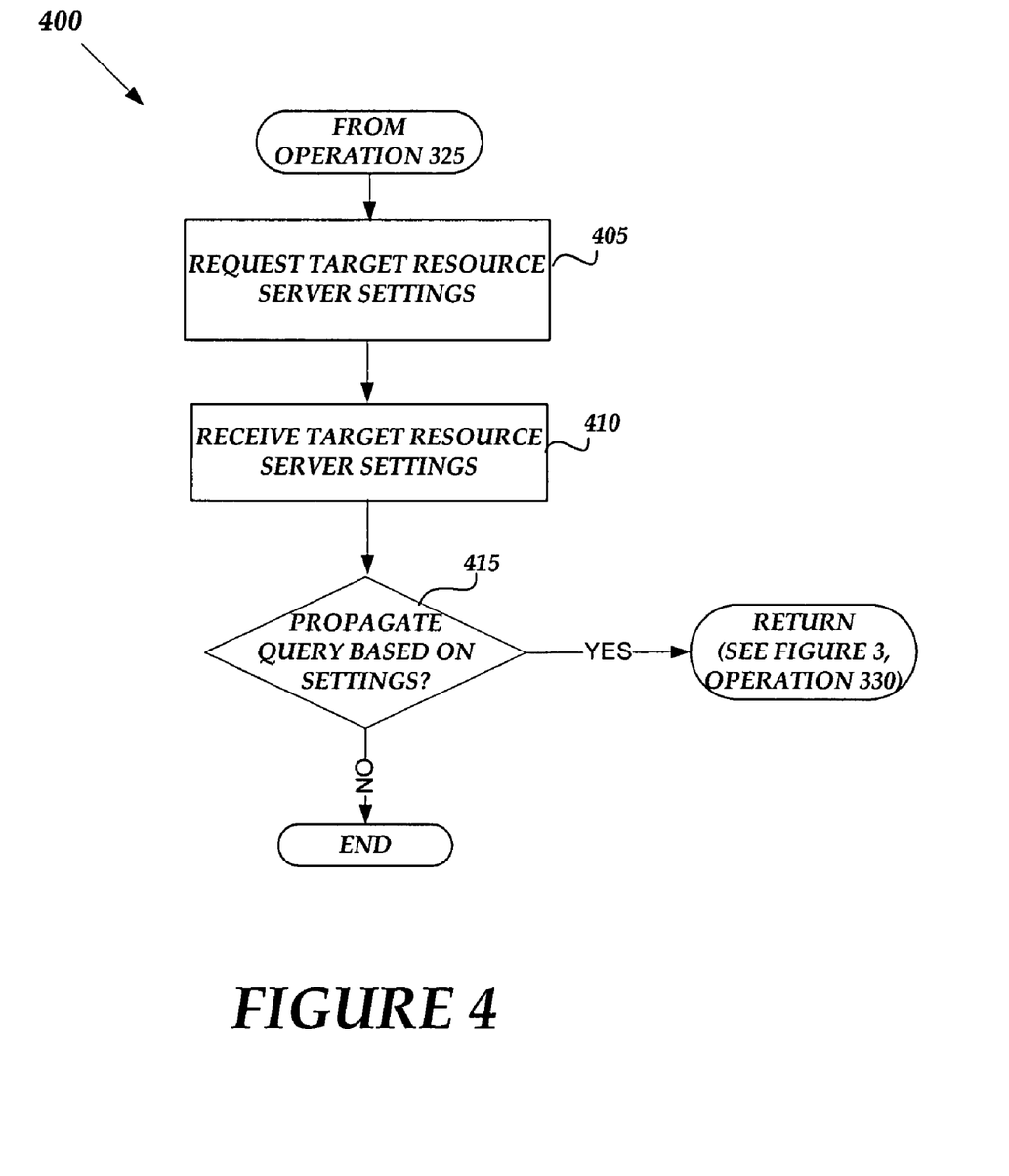
FIG. 4 is a flow diagram illustrating a routine for checking resource server settings to determine permissions associated with propagating a data request made by a requestor in a computer network, in accordance with various embodiments.

Turning now to FIG. 4, a flow diagram illustrating a routine 400 for determining whether a requestor is permitted to access data for answering the query on the target server identified at operation 320 in FIG. 3, will now be described under an embodiment. From operation 325, the routine 400 begins at operation 405, where the shared resources portal 110 requests settings associated with the identified target resource server. For example, the shared resources portal 110 may identify the shared resource server 102A as the target resource server and subsequently request the server settings 106A. As discussed above with respect to FIG. 1, the server settings 106 include various settings such as email settings, corporate retention policies, and permissions as to which workgroups within an organization may have access to certain documents.

From operation 405, the routine 400 continues to operation 410, where the shared resources portal 110 receives the requested target resource server settings for reviewing any permissions contained therein. In particular, the target resource server may be configured to automatically propagate the sever settings upon a request by the shared resources portal 110.

From operation 410, the routine 400 continues to operation 415, where the shared resources portal 110 determines whether to propagate the query from the requester to the target resource server based on the received settings. In particular, the shared resources portal 110 may determine, based on the settings, whether the requester is permitted to access data which may be referenced in the query. For example, the shared resources portal may have identified a server containing financial services information as the target server for a query from a requestor who is a stock trader, but if the target server settings prevent stock traders from accessing corporate financial information, then such a query would not be propagated to the identified target server.

Thus, if at operation 415, it is determined that the server settings prevent a query from being propagated to the identified target server, the shared resources portal 110 may deny the query and the routine 400 then ends. However, if at operation 415, it is determined that the server settings permit a query to be propagated to the identified target server, then the routine 400 returns to operation 330 of the routine 300 of FIG. 3.

Returning now to FIG. 3, the routine 300 continues from operation 325 to operation 330, where the shared services portal 110 propagates the query to the identified target resource server. Once the query is received by the target resource server, a response to the query is then communicated back to the shared services portal 110 for distribution to either the home server 120 or the client computer 130. In accordance with various embodiments, the response to the query may include a listing of document templates, document fragments, or other data which are relevant to a role performed by a user of the client computer 130 in a business organization, for example. From operation 330, the routine 300 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of targeting shared resources in a computer network, comprising:

receiving, in a shared resources portal in the computer network, a shared resources query from a requestor;

identifying a target resource server to which to route the query from among a plurality of the shared resources by filtering data provided by a plurality of shared resource servers based on at least one context, the at least one context comprising a role associated with the requester;

determining, based on the at least one context in the query, if the query can be answered by the shared resources portal;
if so, then identifying the shared resources portal as the target resource server; and
if the query can not be answered by the shared resources portal, then identifying from among the plurality of shared resource servers, a server external to the shared resources portal as the target resource server based on the at least one context comprises comparing the at least one context to a schema associated with each of the plurality of shared resource servers to identify the target resource server, the schema comprising a plurality of metadata and taxonomy tags associated with each of the plurality of shared resource servers which define the content provided by each of the plurality of shared resource servers, the plurality of metadata and taxonomy tags comprising at least an identifier tag, a name tag, a description tag, a type tag, a category tag, and a uniform resource locator (URL) tag;
requesting a plurality of identified target resource server settings;
receiving the plurality of identified target resource server settings in the shared resources portal, wherein the plurality of identified target resource server settings are automatically propagated to the shared resources portal by the identified target resource server; and
determining, based on the received plurality of identified target resource server settings, whether to propagate the query to the identified target resource server; and
processing the query in the identified target resource server.

2. The method of claim 1, wherein processing the query in the identified target sever comprises propagating the query to the external server identified as the target resource server.

3. The method of claim 1, wherein receiving a shared resources query from a requestor comprises receiving a request for a document template.

4. The method of claim 1, wherein receiving a shared resources query from a requestor comprises receiving a request for a document fragment.

5. The method of claim 1, wherein receiving a shared resources query from a requestor comprises receiving a data request.

6. The method of claim 1, wherein receiving a shared resources query from a requestor comprises receiving a shared resources query from a home server in the computer network.

7. The method of claim 1, wherein receiving a shared resources query from a requestor comprises receiving a shared resources query from a client computer in the computer network.

8. A system for targeting shared resources in a computer network, comprising:
a memory for storing executable program code; and
a processor, functionally coupled to the memory, the processor being responsive to computer-executable instructions contained in the program code and operative:
to receive a shared resources query from a requestor in the computer network;
to identify a target resource server to which to route the query from among a plurality of the shared resources by filtering data provided by a plurality of shared resource servers based on at least one context, the at least one context comprising a role associated with the requester, and
to identify a target resource server to which to route the query from among a plurality of the shared resources by filtering data provided by a plurality of shared resource servers based on at least one context, is operative to compare the at least one context in the query to a plurality of metadata and taxonomy tags associated with each of the plurality of shared resource servers which define the content provided by each of the plurality of shared resource servers, the plurality of metadata and taxonomy tags comprising at least an identifier tag, a name tag, a description tag, a type tag, a category tag, and a URL tag;
to request a plurality of identified target resource server settings; to receive the plurality of identified target resource server settings in response to the request, wherein the plurality of identified target resource server settings are automatically propagated to the requester by the identified target resource server;
to determine, based on the received plurality of identified target resource server settings, whether a permission exists to propagate the query to the identified target resource server; and
if the permission exists, to propagate the query to the identified target resource server.

9. The system of claim 8, wherein the processor, in receiving a shared resources query from a home server in the computer network, is operative to receive a data request from a home server in the computer network.

10. The system of claim 8, wherein the processor, in receiving a shared resources query from a home server in the computer network, is operative to receive a data request from a client computer in the computer network.

11. A non-transitory computer-readable storage medium containing computer executable instructions which, when executed on a computer, will cause the computer to perform a method of targeting shared resources in a computer network, comprising:
receiving, in a shared resources portal in the computer network, a shared resources query from a requestor;
determining, based on at least one context associated with the requestor, if the query can be answered by the shared resources portal;
if so, then identifying the shared resources portal as the target resource server, wherein identifying from among the plurality of shared resource servers, a server external to the shared resources portal as the target resource server based on the at least one context comprises comparing the at least one context in the query to a schema associated with each of the plurality of shared resource servers to identify the target resource server, the schema comprising a plurality of metadata and taxonomy tags associated with each of the plurality of shared resource servers which define the content provided by each of the plurality of shared resource servers, the plurality of metadata and taxonomy tags comprising at least an identifier tag, a name tag, a description tag, a type tag, a category tag, and a URL tag;
requesting a plurality of identified target resource server settings;
receiving the plurality of identified target resource server settings in the shared resources portal, wherein the plurality of identified target resource server settings are automatically propagated to the shared resources portal by the identified target resource server; and
determining, based on the received plurality of identified target resource server settings, whether to propagate the query to the identified target resource server;

if the query can not be answered by the shared resources portal, then identifying from among a plurality of shared resource servers, a server external to the shared resources portal as the target resource server based on the at least one context, wherein each of the plurality of shared resource servers are associated with a unique department within a business organization, wherein the at least one context comprises a role associated with the requester, and wherein the role comprises an organizational role in the unique department within the business organization associated with one of the plurality of shared resource servers; and propagating the query to the identified target resource server.

12. The non-transitory computer-readable storage medium of claim 11, wherein receiving a shared resources query from a requestor comprises receiving a shared resources query from a home server in the computer network.

13. The non-transitory computer-readable storage medium of claim 11, wherein receiving a shared resources query from a requestor comprises receiving a shared resources query from a client computer in the computer network.

14. The non-transitory computer-readable storage medium of claim 11, wherein receiving a shared resources query from a requestor comprises receiving at least one of a data request, a request for a document template, and a request for a document fragment.

* * * * *